United States Patent [19]
Akins

[11] Patent Number: 4,475,126
[45] Date of Patent: Oct. 2, 1984

[54] VISUAL IMAGE DISPLAY APPARATUS

[75] Inventor: Kristine E. Akins, Columbus, Ohio

[73] Assignee: Videosphere, Inc. of Ohio, Columbus, Ohio

[21] Appl. No.: 408,423

[22] Filed: Aug. 16, 1982

[51] Int. Cl.³ .............................................. H04N 5/72
[52] U.S. Cl. ..................................... 358/250; 350/4.1; 358/254
[58] Field of Search ............... 358/250, 251, 252, 253, 358/254, 255; 350/4.1

[56] References Cited

U.S. PATENT DOCUMENTS

| 3,357,768 | 12/1967 | Cox | 350/4.1 |
| 3,542,948 | 11/1970 | Wolff | 358/87 |
| 3,642,342 | 2/1972 | DeLarrain | 350/4.1 |
| 3,809,879 | 5/1974 | Gonzalez | 350/4.1 |
| 4,354,205 | 10/1982 | Lowe | 358/253 |

FOREIGN PATENT DOCUMENTS 2093208 8/1982 United Kingdom ................ 350/4.1

Primary Examiner—Howard W. Britton
Attorney, Agent, or Firm—Frank H. Foster

[57] ABSTRACT

Four mirrors are arranged to diverge outwardly away from the image on a television screen and have their reflective surfaces facing inwardly. The illusion of a solid object having a spherical, polyhedral or other three-dimensional shape is created having a surface of adjoining, multifaceted duplicates and reversed duplicates of the image on the screen.

11 Claims, 6 Drawing Figures

VISUAL IMAGE DISPLAY APPARATUS

TECHNICAL FIELD OF THE INVENTION

This invention relates generally to the creation and display of visual or graphical images having a unique appearance and more particularly relates to the creation of an illusion for purposes of architectural design, entertainment, education and attracting attention.

BACKGROUND OF THE INVENTION

Historically, there have been a variety of visual displays for commercial, esthetic, entertainment and educational purposes. These vary from the simple two dimensional images of paintings and simple commercial signs through lighted and moving displays such as neon signs, flashing light boards and movies and cathode ray tube images such as used in television and computer displays to three dimensional displays such as sculptures and holograms. They display esthetically pleasing images, information and data and are used for amusement, for entertainment, for appealing to human curiosity, decoration and for transmitting information.

Mirrors have previously been used to create visual image displays. For example, multiple mirrors have been placed side by side in amusement houses or carnivals which create multiple images receding to infinity. Parallel mirrors have also been positioned at 60° angles with a variable image at their end to construct a kaleidoscope.

BRIEF SUMMARY OF THE INVENTION

The present invention takes a simple, two-dimensional primary image, such as that displayed on a backlighted movie screen or a cathode ray tube display, and generates the illusion of a solid object with a spherical, polyhedral or other such three-dimensional shape having a surface of adjoining multifaceted duplicates and reversed duplicates of the primary image. Thus, for example, a display on a cathode ray tube is multiplied to appear as adjacent duplicate displays covering the surface of a sphere.

The visual display apparatus of the present invention has an array of mirrors which diverge outwardly away from a primary image display surface, each mirror intersecting its adjacent mirrors and having its reflective side facing toward the other mirrors to generate an image of an object having a surface composed of adjoining repetitions of the image of the primary display surface.

The illusion created is greatly enhanced and particularly striking when the primary image display surface is a portion of a spherical surface and the mirrors are aligned perpendicularly to each other and along radii of the spherical surface. The angle of the mirrors is precisely related to the compound curvature of the primary image screen in such a way as to create 13 images of primary graphic importance labelled a-m. The 12 very exterior images have high level importance because of the three dimensionality given to the sphere by these images which appear to continue as far as the eye can see around the sphere (FIG. 6). The contour and the surface pattern of the display surface is duplicated to create the image of a continuous surface which smoothly blends together the contour of the duplicate images, without contour discontinuities, so that it gives the esthetically pleasing appearance that the primary surface is extended to complete the sphere.

Preferably, the primary image is moving and changing so that the entire surface of the image of the sphere is reflecting that motion. Also preferably, the reflectivity coeficient of the mirrors is slightly less than that of the primary image screen (82%/75%) to create a proper shading of the sphere and enhance its three dimensionality.

Such a device has a variety of uses. It may, for example be used for entertainment in the form of video or arcade games, video music enhancement, entertainment or education, the display of images for esthetic purposes such as in interior decoration in an office reception room to gain and hold the curiosity and interest of visitors or as a display which will attract the attention of passersby such as at a store or at a trade show booth. The displays of the present invention may be computer or camera generated or created by combinations of the two and lends itself to both artisitic creativity and the display of information.

Figure 1:
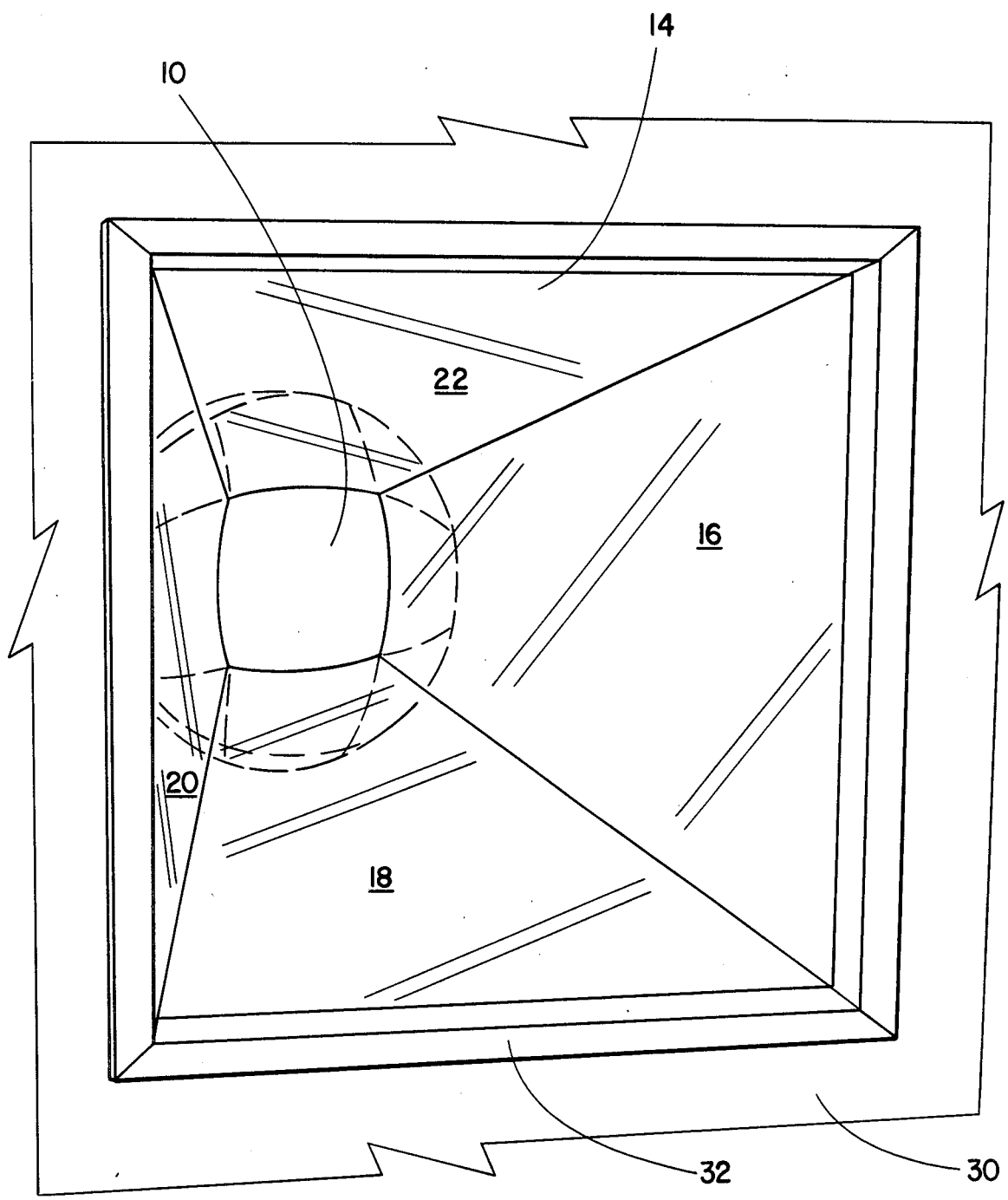
FIG. 1 is a front view in perspective of an embodiment of the invention showing the primary image display surface and the apparent reflected image.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

DETAILED DESCRIPTION OF THE PREFERRED EMBODIMENT

Figure 2:
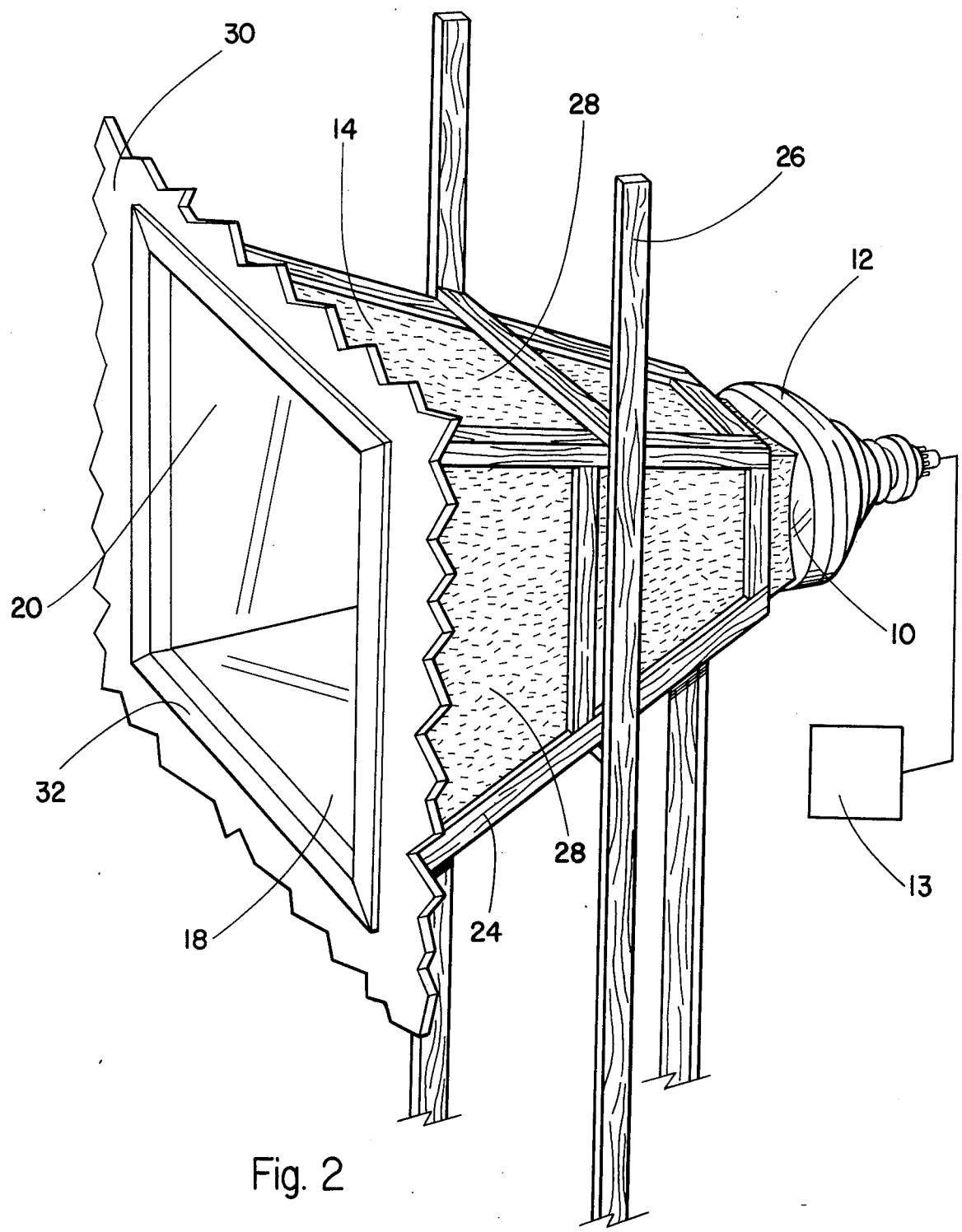
FIG. 2 is a view in perspective of the structure of the embodiment of the invention illustrated in FIG. 1 and broken away from a wall surface.
Figure 3:
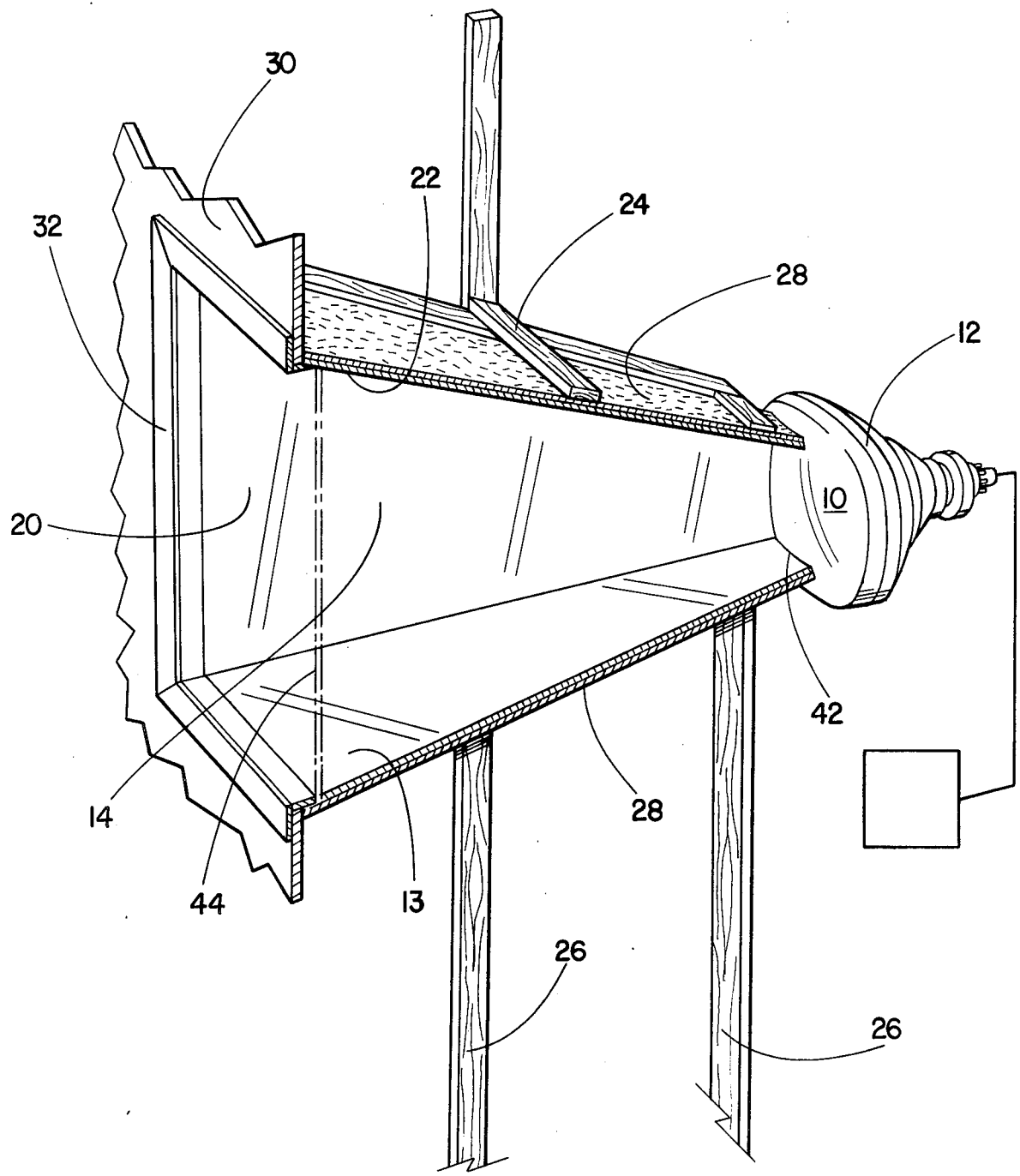
FIG. 3 is a view in vertical section of the embodiment of the invention illustrated in FIG. 2.

FIGS. 1, 2 and 3 illustrate the construction of the preferred embodiment of the invention. The invention has a primary image display surface 10 which may, for example, be the screen of a cathode ray tube 12 but alternatively might be a backlighted movie screen or even a frontlighted movie screen. Preferably this screen is a compound curve being a section of a sphere. It includes a means 13 for varying the display preferably as a continually moving graphic display which is presented on the primary image display surface 10. This means 13 may include the cathode ray tube 12 and its associated electronic equipment for generating a display on the surface of the cathode ray tube 12 or alternately the means may include other equipment for generating a motion picture or other changeable or fixed primary image.

An array of mirrors 14 extends divergingly and outwardly away from the primary image display surface 10. In the preferred embodiment there are four mirrors 16, 18, 20 and 22. Each mirror has its reflective side facing centrally inwardly toward the other mirrors. The term "mirror" is used to refer to a reflective surface including those made of polished stainless steel, coated plastics and other mirror surfaces.

Preferably, the mirrors are four, generally trapezoidally shaped, symmetrical mirrors which are of identical shape and size. They lie in planes which perpendicularly intersect each other at their edges and all intersect the image display surface at the same angle. Most preferably the display surface, instead of being planar, is a portion of a spherical surface and the mirrors are aligned substantially along radii of the spherical surface. This causes the apparatus to create an image of a sphere having segments of its surface repeating the primary image.

The mirrors may be supported in a wooden frame 24 having vertical legs 26. Mounted within the frame 24 are a plurality of supporting, planar sheets 28 to which the mirrors themselves are adhered or otherwise supported. Construction means may vary and include metal or plastic fasteners.

Although the device may be a simple free standing display apparatus, advantageously it may be mounted behind a wall 30 provided with a suitable opening surrounded by an attractive frame 32 in the manner of a window or picture.

Figure 4:
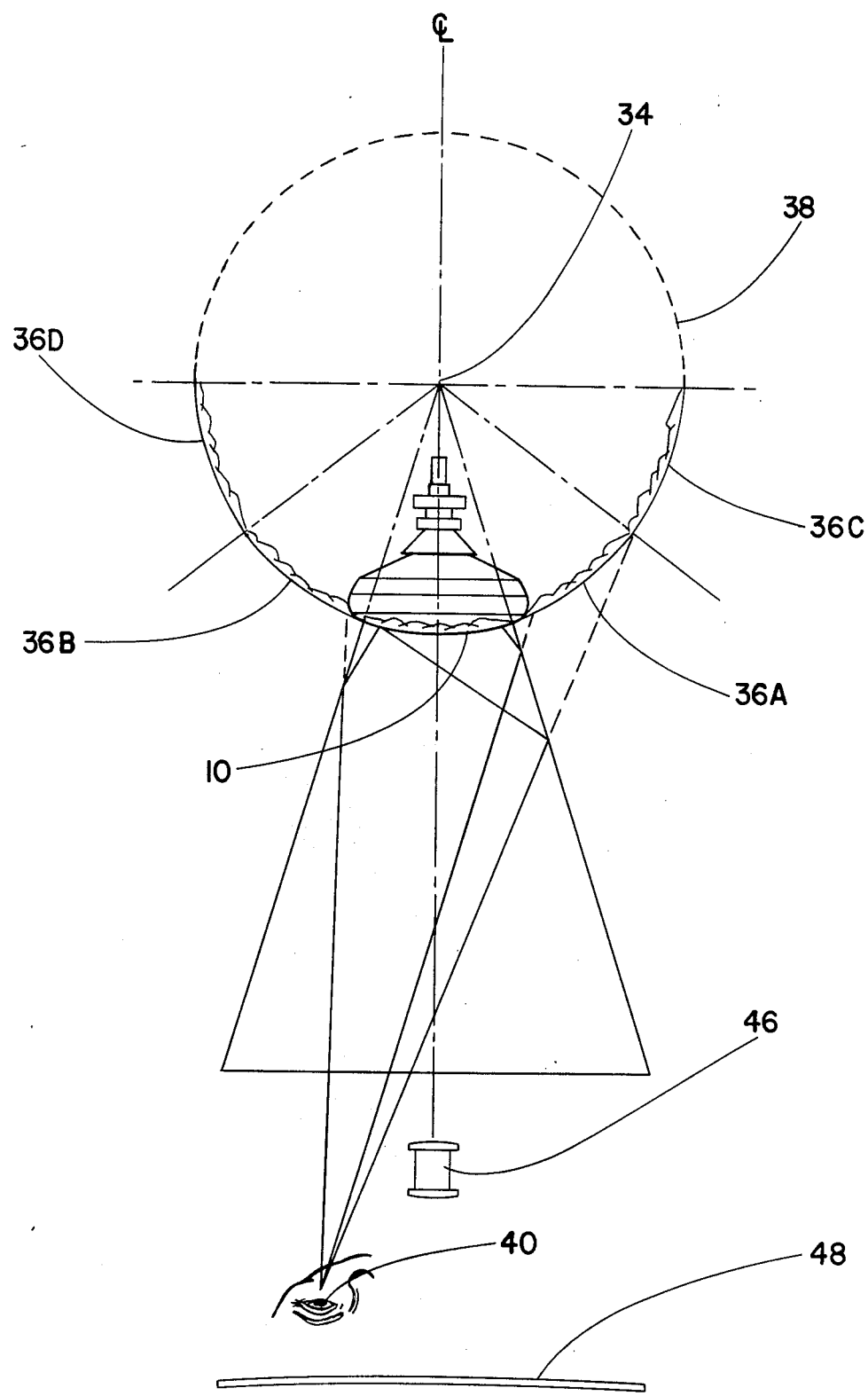
FIG. 4 is a diagrammatic view illustrating the multiple image illusion obtained in the operation of an embodiment of the invention.

Referring now to FIG. 4, in an embodiment having the mirrors aligned along planes intersecting the center 34 of a spherically contoured primary image display surface, the eye sees not only the primary image but also sees primary reflected images 35A and 36B and secondary reflected images 36C and 35D. All these images appear to lie upon the surface of a sphere indicated generally as 38. The result of the reflections, which are diagrammatically illustrated in FIG. 4, is the presentation of an illusion to a viewer's eye 40 that a sphere 38 exists in the position illustrated. The sphere appears multifacted, as also illustrated in FIG. 1, because the primary image is repeated in adjoining repetitions and each repetition is a facet which appears to lie on the surface of the sphere.

If the primary image surface is planar, then the apparatus creates the image of a polygon having each face repeating the image of the primary display surface. If the primary image surface is curved but the mirrors are not aligned along the radii of curvature then the apparent object will neither be spherical nor be a polygon with flat surfaces but will appear to be a polygon-like object with surfaces having adjoining repetitions of the primary surface curvature with the image of the primary surface upon them. If the primary image surface is rectangular an eliptical image may be formed or an irregularly faceted sphere.

The mirrors 14 are preferably all front surface mirrors so that they present only a single reflective surface. Conventional glass mirrors which are silvered on the back are reflective not only at their primary, mirrored surface at the back of the glass but also are somewhat reflective along their front surface. This creates a ghost or double image effect which is undesirable.

It is additionally desirable that the mirrors have a high reflectivity so that the images are not significantly attenuated from the multiple reflections which occur to provide some of the segment repetitions on the apparent spherical surface. It is additionally desirable that the edges 42 of the mirrors which abut the primary image surface 10 be chamfered and curved so that their mirrored surfaces will be immediately adjacent rather than spaced from the primary image surface 10. Any space between the primary image and the edge of the reflective surface produces a corresponding gap or line between the images on the surface of the apparent sphere 38.

Although a variety of equipment is available for generating primary images on a surface, a television system is preferred in which the images are generated by camera and television image generating means as well as computer systems for generating graphics. Combinations of these techniques are available and particularly useful for resourceful and creative persons.

There are a variety of alternative and enhancing modifications which can be made to the present invention.

For example, a one way reflecting mirror 44 may be positioned, as shown in phantom, at the forward end of the diverging array of mirrors 14 with its reflective side facing the primary display surface 10 so that it too will cause reflections of the apparent image, such as the sphere 38. Because of its one way reflecting characteristics a viewer can still view these images.

Additionally, a projection lense 46, illustrated in FIG. 4, may be utilized to project the apparent image onto a screen 48.

Although a single display apparatus as described above gives the illusion of a solid object, that solid object is only visible to a person looking into the array of mirrors 14. However, a plurality of such display units may be combined in the manner illustrated in FIG. 5 so that an individual may walk part way or completely around the combination of display apparatuses and view the sphere from multiple directions.

Figure 5:
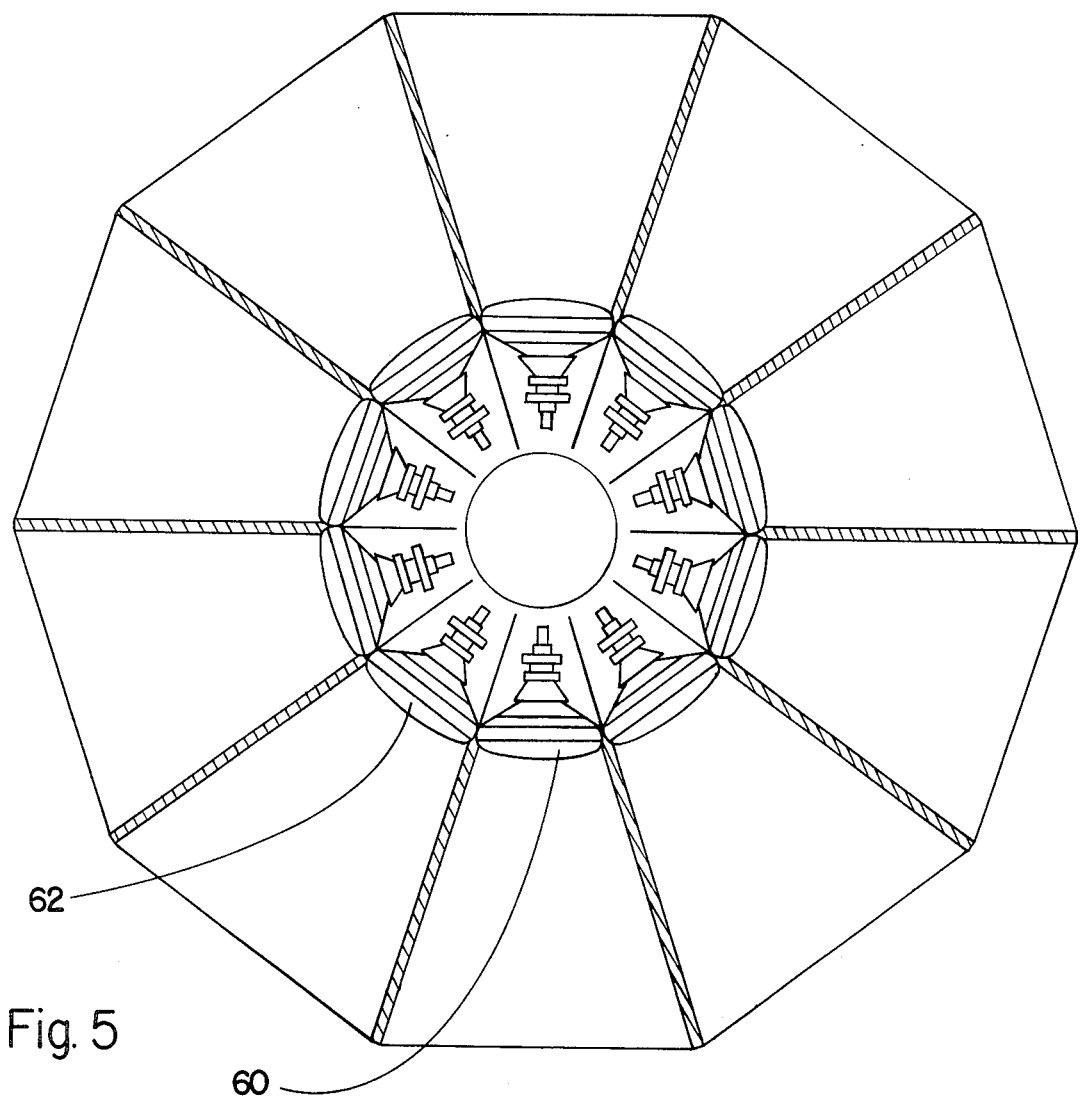
FIG. 5 is a top, plan view of an alternative embodiment of the invention.
Figure 6:
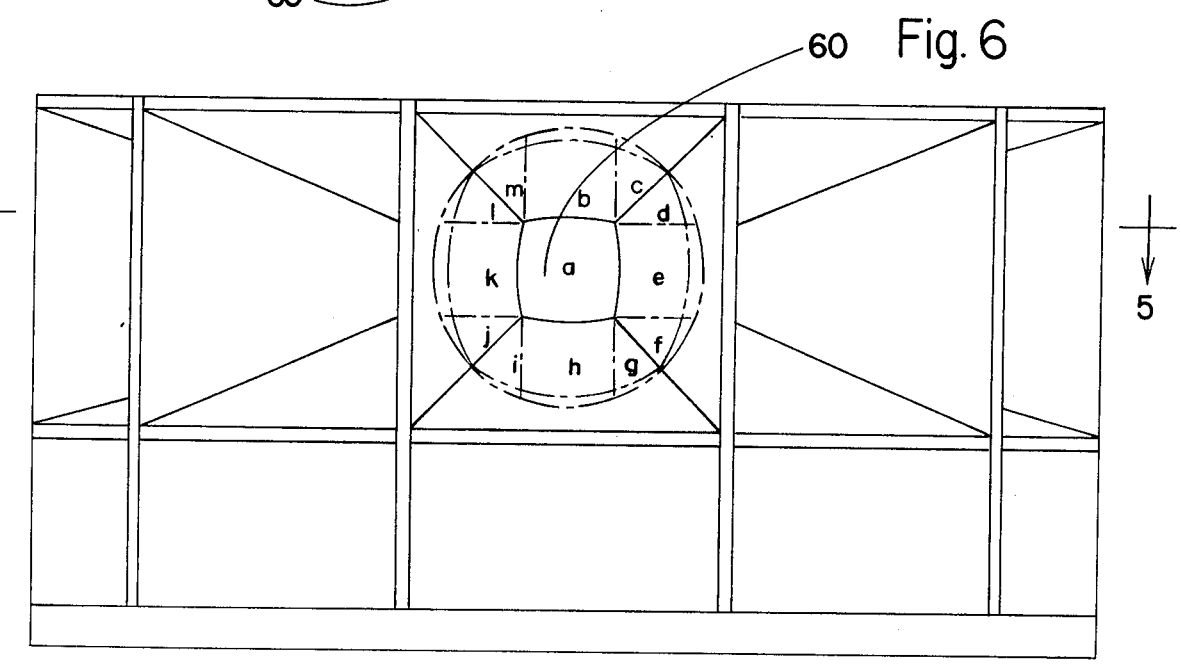
FIG. 6 is a view in front elevation of the embodiment of FIG. 5.

The embodiment of FIG. 5 consists of a plurality of visual display apparatuses of the type described above. Their primary image display surfaces, such as image display surfaces 60 and 62, are positioned centrally and arranged and oriented to face outwardly. The mirror array for each is disposed adjacent its neighbor so that they combine to form a circular arrangement of contiguous arrays as illustrated in FIG. 5 and FIG. 6. With the use of cathode ray tubes, the identical image may be displayed on each primary image surface so that identical spheres are apparent from each viewing angle. Alternatively, different images may be used on each primary display surface but they may be coordinated so that the polygon image may appear to have different surface images on its different apparent surfaces.

Although the same type of mirror as used in the other illustrated embodiment can be used, alternatively double reflective surface mirrors can be used. As another alternative to the use of a different video screen for each primary image surface, a mirror and prism system can be used to display a single image on each primary display surface simultaneously.

While preferred embodiments of the present invention have been illustrated and described in detail, it will be understood that various modifications in details of construction and design may be made without departing from the spirit of the invention or the scope of the following claims.

I claim:

1. A visual display apparatus comprising:
  (a) a primary image display surface;
  (b) means for varying the display on said surface; and
  (c) an array of four mirrors diverging outwardly away from said display surface, each mirror intersecting its adjacent mirrors at a right angle and having its reflective side facing toward the other mirrors;

wherein an image is generated of an object having a surface composed of adjoining repetitions of the image of the primary display surface.

2. A display apparatus in accordance with claim 1 wherein each of said mirrors are planar and each intersects said image display surface at substantially the same angle to provide an apparent image of a polyhedron or sphere.

3. A display apparatus in accordance with claim 2 wherein said display surface is planar and said display apparatus creates an image of a polygon each face repeating the image of said display surface.

4. A display apparatus in accordance with claim 2 wherein said display surface is a portion of a spherical surface and said mirrors are aligned substantially along radials of said spherical surface whereby said display apparatus creates an image of a sphere having segments of its surface repeating the image of said display surface.

5. A display apparatus in accordance with claim 4 wherein said display surface is the screen of a cathode ray tube and said display varying means comprises video means for generating time changing, moving images on said screen.

6. A display apparatus in accordance with claim 5 wherein computer image generating means is connected to said television means for generating said images.

7. A display apparatus in accordance with claim 5 wherein said mirrors comprise four symmetrically positioned substantially trapezoidally shaped mirrors.

8. A display apparatus in accordance with claim 1 wherein each of said mirrors is a front surface mirror.

9. An apparatus in accordance with claim 1 wherein a projection lense is positioned in front of said display surface for focusing an image of said object.

10. An apparatus in accordance with claim 1 wherein a one way mirror is positioned forwardly of said display surface with its reflective side facing said display surface.

11. A visual display apparatus comprising a plurality of visual display apparatuses in accordance with claim 2 having their image display surfaces arranged in a central, outwardly facing orientation with their arrays or mirrors disposed adjacent each other.

* * * * *